United States Patent [19]

Schams et al.

[11] 4,216,257
[45] Aug. 5, 1980

[54] STRIP MATERIAL FOR FORMING FLEXIBLE BACKED FASTENERS

[75] Inventors: Ronald T. Schams, May Township, Washington County; James N. Brown, White Bear Lake, both of Minn.

[73] Assignee: Minnesota Mining and Manufacturing Company, St. Paul, Minn.

[21] Appl. No.: 31,973

[22] Filed: Apr. 20, 1979

[51] Int. Cl.² .......................... B32B 3/06; B32B 5/18; B32B 7/04; A44B 17/00
[52] U.S. Cl. .......................... 428/93; 24/204; 428/95; 428/99; 428/100; 428/315
[58] Field of Search .......................... 24/204; 428/86, 92, 428/93, 95, 99, 100, 315

[56] References Cited

U.S. PATENT DOCUMENTS

| | | | |
|---|---|---|---|
| 3,192,589 | 7/1965 | Pearson | 24/204 |
| 3,266,113 | 8/1966 | Flanagan | 24/204 |
| 3,353,663 | 11/1967 | Kayser | 24/204 |
| 3,365,757 | 1/1968 | Billarant | 24/204 |
| 3,423,764 | 1/1969 | Cassling | 24/204 |
| 3,555,630 | 1/1971 | Wylde | 24/204 |
| 3,574,107 | 4/1971 | Hurka | 428/99 |
| 3,577,607 | 5/1971 | Ikoma | 24/204 |
| 3,686,718 | 8/1972 | Brumlik | 24/204 |
| 3,879,835 | 4/1975 | Brumlik | 24/204 |
| 3,961,398 | 6/1976 | Herterich | 24/204 |

FOREIGN PATENT DOCUMENTS

| | | | |
|---|---|---|---|
| 2047243 | 12/1971 | France | 24/204 |
| 589380 | 3/1959 | Italy | 24/204 |

Primary Examiner—William J. Van Balen
Attorney, Agent, or Firm—Cruzan Alexander; Donald M. Sell; William L. Huebsch

[57] ABSTRACT

A strip material from which portions may be severed to form portions of fasteners, including a flexible bonding layer, U-shaped monofilaments bonded in the bonding layer and having headed projecting portions, a low density foam layer on the side of the bonding layer opposite the headed projections, and a layer of soft tacky pressure sensitive adhesive on the side of the layer of foam opposite the bonding layer.

10 Claims, 2 Drawing Figures

STRIP MATERIAL FOR FORMING FLEXIBLE BACKED FASTENERS

BACKGROUND OF THE INVENTION

This invention realtes to elongate strip material which strip material may be severed to form portions that can be attached to separate objects and which portions have headed projections which will releasably engage so that the portions will provide a releasable fastener between the objects U.S. Patent Application No. 714,132, filed Aug. 13, 1976, now abandoned, describes such a strip material which comprises a flexible polymeric bonding layer; a multiplicity of flexible, resilient, generally U-shaped monofilaments of longitudinally oriented polymeric material, each including a central bight portion embedded in the bonding layer, two stem portions extending from the bight portion and projecting generally normal to a surface of the bonding layer; and enlarged generally circular heads at the distal ends of the stem portions. Each of the heads has an outer cam surface which cam surface is adapted for engagement with the cam surfaces of heads along a different portion of the strip material to produce deflection of the stem portions and movement of the heads on the stem portions past each other to releasably engage the portions, and has a latching surface opposite the cam surface which latching surface is generally planar, extends at generally a right angle radially from its supporting stem portion, and is adapted to engage similar latching surfaces on the heads of the other portion when it is engaged.

While fasteners made from portions cut from the strip material described in Application No. 714,132 have provided many advantages over other known fasteners for many applications, problems have been encountered in attaching those portions to the surfaces of objects when the means of attachment are layers of pressure-sensitive adhesive between the bonding layers of those portions and the surfaces of the objects, particularly where the objects have a somewhat rough surface texture as may be found on the back of wood paneling, on cement block walls, or even on painted wallboard or plaster. Under those circumstances the fasteners have been found not to initially adhere as well as may be desired, and can peel away from the surfaces to which they are adhered when the portions are repeatedly engaged and disengaged.

SUMMARY OF THE INVENTION

According to the present invention there is provided an improved strip material of the type described above, portions of which (called fastener portions herein) can reliably be adhered to fairly rough surfaces on objects, will withstand an extremely high number of engagements and disengagements with each other without peeling away from the surfaces on the objects, and will engage with less force and disengage with a higher force than equivalent strip material without the improvement.

The improvement according to the present invention comprises a layer of low density closed cell polymeric foam having a density of less than 0.32 grams per cubic centimeter (20 pounds per cubic foot) on the side of the flexible bonding layer opposite the projecting stem portions, and a layer of soft tacky pressure sensitive adhesive on the side of the layer of foam opposite the bonding layer.

The layer of low density foam and the layer of sofy tacky pressure sensitive adhesive complement each other to allow the adhesive to initially firmly engage a rough surface and to retain such engagement despite repeated engagement and disengagement of the fastener portions. When a firm pressure sensitive adhesive (instead of a soft tacky pressure sensitive adhesive) is used to adhere the layers of low density foam to the rough surface of an object, the firm adhesive will more readily peel away from the rough surfaces when the fastener portions repeatedly engage and disengage. Apparently this happens because all portions of the firm adhesive have not been brought into intimate contact with all portions of the surface of the objects when the fastener portions are pressed into place. Similarly when a soft tacky pressure sensitive adhesive is used on a high density foam (instead of a low density foam) which high density foam is less flexible, repeated engagements and disengagements of the fastener portions will also tend to peel the adhesive from rough surfaces to which the fastener portions are adhered. Apparently this happens either because the more inflexible foam will not allow the pressure sensitive adhesive to be pressed into intimate contact with the rough surface, or, even if the foam is deformed enough to press the adhesive into contact, because the foam will spring back after the application pressure is released and will tend to peel the adhesive away in combination with forces which are applied unevenly across the adhesive layer by the stiff foam when the fastener portions are repeatedly engaged and disengaged.

When the soft tacky pressure sensitive adhesive and the layer of foam having a density of less than 0.32 grams per cubic centimeter (20 pounds per cubic foot) are used together, however, the adhesive can wet and flow into intimate contact with the rough surface of an object. Stresses in the backing itself will not exert a force to pull the adhesive away from the surface in localized areas, and the stress applied to the adhesive when the fastener portions are separated will tend to be evenly distributed by the flexible foam so that it will not tend to initiate localized pulling away of the adhesive.

Additionally, the layer of low density foam and flexible bonding layer complement each other to provide a lower engagement force and a greater disengagement force between the heads on the two fastener portions, and to decrease the wear between the heads as the fastener portions are repeatedly engaged and disengaged. During engagement of the heads the easily compressible foam layer allows the flexible bonding layer to bend in different directions at different localized areas of the bonding layer to facilitate deflection of the stem portions and movement of the heads past each other. When the portions are disengaged, the foam layer also bends at different localized areas of the bonding layer to compensate for small differences in length between the stem portions so that more of the latching surfaces of the heads are in engagement at the same time and the force required to separate the fastener portions is increased.

To provide both the desired flexibility and strength, the foam layer should be of the closed cell variety and have a density that is less than 0.32 grams per cubic centimeter (20 pounds per cubic foot) and preferably is generally in the range of 0.06 to 0.16 grams per cubic centimeter (4 to 10 pounds per cubic foot). The thickness of the foam should be adequate to allow the layer of adhesive to conform to a rough surface on an object and to allow the bonding layer to bend and facilitate deflection of the stem portions when the heads engage, and to allow more of the heads to engage when force is applied to separate the fastener portions. The layer of foam should not, however, be so thick that shearing forces within the foam layer will cause it to delaminate. Closed cell foam layers of up to about 0.16 centimeters (1/16 inch) thick are considered suitable, whereas a layer of closed cell polyethylene foam about 0.08 centimeters (1/32 inch) thick and having a density of 0.10 grams per cubic centimeter is preferred.

The soft tacky pressure sensitive adhesive should be an adhesive that wets out, flows onto and adheres to a rough surface with a minimum of application force. The preferred adhesive is a modified block copolymer S-B-S type adhesive, which type of adhesive is well known in the art and is described in detail in U.S. Pat. Nos. 3,239,478 and 3,753,936, and Phillips Petroleum Company Adhesives Laboratory Report No. 5 dated Jan. 19, 1971, the disclosures whereof are incorporated herein by reference. The adhesive should be formulated so that when it is peeled from a polished surface on a stainless steel plate at a 90 degree removal angle and at a removal rate of 30.5 centimeters (12 inches) per minute (as by an "Instron" machine), the minimum adhesion between the adhesive and the plate will be 1.43 kilograms per centimeter (8 pounds per inch) of adhesive width at the peel line. Soft tacky adhesives producing readings just over 1.43 kilograms per centimeter (8 pounds per inch) width at the peel line are preferred for high temperature and/or high shear application, whereas soft tacky adhesives having minimum adhesion of up to around 3.57 kilograms per centimeter (20 pounds per inch) of width at the peel line are better suited for room temperature and/or high peel applications.

The bonding layer is preferably of a polyolefin about 0.05 centimeter (0.02 inch) thick, which produces a bonding layer that is sufficiently flexible that it can bend in localized areas while having sufficient stiffness and strength to securely anchor the stem portions which preferably are also of a polyolefin so that the stem portions can be heat fused into the bonding layer.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENT

Figure 1:
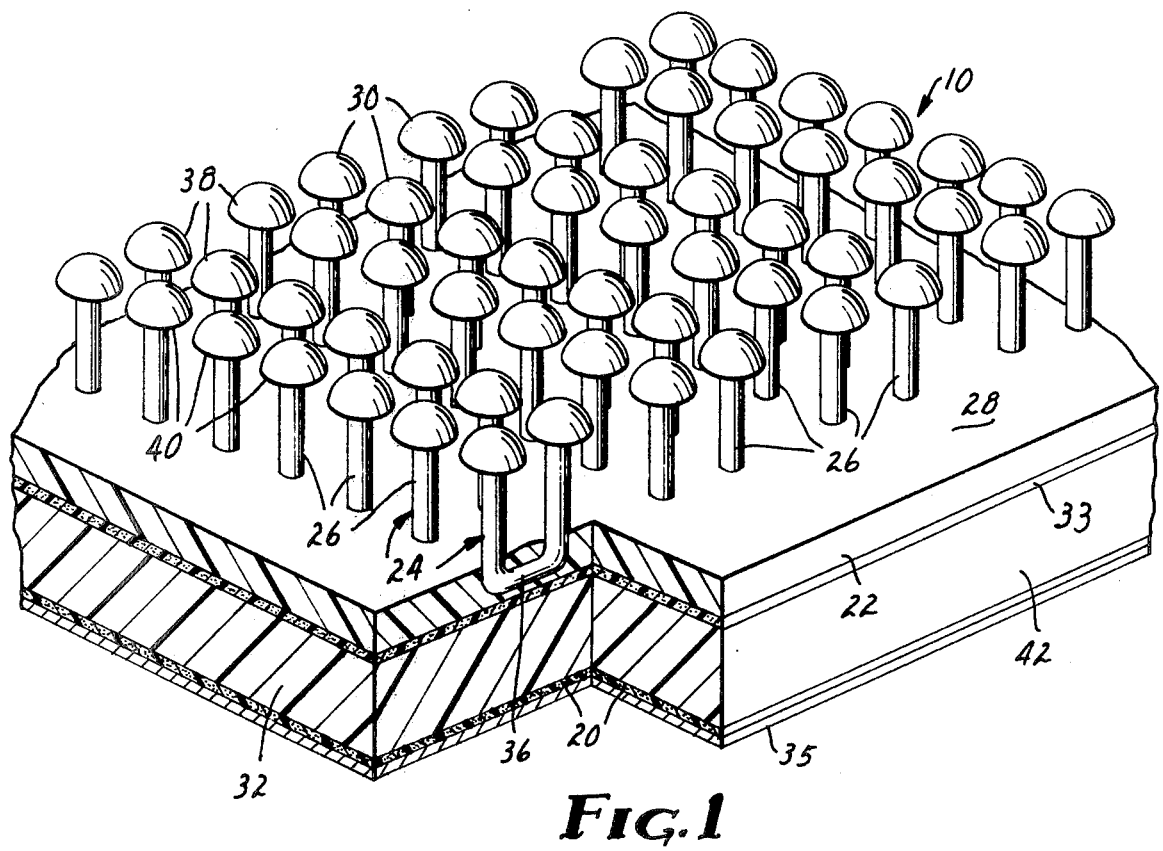
FIG. 1 is a fragmentary perspective view of a strip material according to the present invention.
Figure 2:
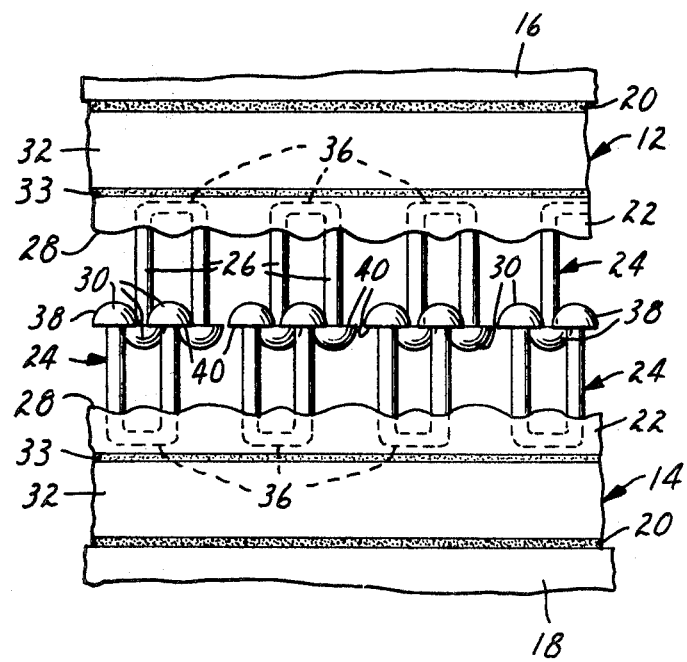
FIG. 2 is a reduced sectional view of two portions of the strip material releasably engaged to fasten together two objects to which the portions are adhered.

Referring now to the drawing there is shown in FIG. 1 an enlarged fragment of an elongate strip material 10 according to the present invention, which strip material 10 may be severed into at least two fastener portions 12 and 14 (FIG. 2). The fastener portions 12 and 14 may then be attached to the surface of different objects 16 and 18 via layers of pressure-sensitive adhesive 20 included in the fastener portions 12 and 14 and engaged with each other as illustrated to fasten the objects 16 and 18 together.

Generally the strip material 10 comprises a bonding layer 22 in which are embedded and bonded or fused a plurality of flexible resilient generally U-shaped monofilaments 24. The monofilaments 24 have stem portions 26 that project from a major surface 28 of the bonding layer 22 and have heads 30 at their distal ends. The bonding layer 22 and the method by which the monafilaments 24 are bonded to the bonding layer 22 are described in greater detail in U.S. Patent Application No. 714,132, the content whereof is incorporated herein by reference. Also, the strip material 10 includes a layer of low density foam 32 (i.e., having a density of less than 0.32 grams per cubic centimeter (20 pounds per cubic foot) and preferably having a density generally in the range of 0.06 to 0.16 grams per cubic centimeter (4 to 10 pounds per cubic foot) less than 0.16 centimeter (1/16 inch) thick and preferably about 0.08 centimeter (1/32 inch) thick, which layer of foam 32 is adhered to the surface of the bonding layer 22 opposite the surface 28 by a layer of adhesive 33 which may be of the same material as the layer of adhesive 20; and the layer of pressure sensitive adhesive 20 which is a soft tacky pressure-sensitive adhesive and is covered by a removeable silicone coated liner 35.

The bonding layer 22 in which the U-shaped monofilaments 24 are bonded is of a uniform nonfibrous nonoriented polymeric material which has a predetermined thickness adapted to receive bight portions 36 of the U-shaped monofilaments 24. The U-shaped monofilaments are formed of a longitudinally oriented polymeric material. The stem portions 26 of each monofilament 24 are of essentially the same length, project at generally a right angle from the surface 28 of the bonding layer 22 and extend from the ends of the embedded bight portion 36 of the monofilament 24. The heads 30 have arcuate generally semispherical cam surfaces 38 opposite the bonding layer 22, so that the heads 30 on each fastener portion 12 or 14 severed from the strip material 10 are adapted for engagement with the cam surfaces 38 on the heads 30 of any other fastener portion 12 or 14 severed from the strip material 10 to produce the necessary side deflection of the stem portions 26 upon movement of the heads 30 toward each other with the bonding layers 22 generally parallel so that the heads 30 may pass to engage the fastener portions 12 and 14 in the manner illustrated in FIG. 2. Also, the heads 30 on each fastener portion 12 or 14 each have a generally planar latching surface 40 extending radially outwardly of the stem portion 26 which latching surface 40 is adapted to engage the latching surface 40 on one or more of the heads 30 of another fastener portion 12 or 14 to retain the heads 30 in engagement until a predetermined force is applied to separate the fastener portions 12 and 14.

The monofilaments 24 are bonded in the bonding layer 22 with their bight portions 36 parallel to each other and to parallel edges 42 of the bonding layer 22. The bight portions 36 of groups of the monofilaments 24 are disposed side by side to form a series of generally parallel rows, with each row of monofilaments 24 providing two corresponding rows of aligned stem portions 26 and heads 30 which are disposed generally normal to the edges 42. The stem portions 26 on each U-shaped monofilament 24 and the adjacent stem portions 26 of adjacent U-shaped monofilaments 24 along the rows (i.e., in directions both parallel to and at right angles to the length of the bight portions 36) are spaced apart so that the head 30 of a monofilament 24 on another portion of the strip material 10 may be positioned therebetween without substantially spreading the stem portions 26. The heads 30 on these adjacent stem portions 26, however, are spaced apart a distance less than their own diameters so that the heads 30 on another fastener portion 12 or 14 of the strip material 10 may only move therebetween upon separation of the heads 30 by resilient deflection of the stem portions 26. This spacing is experimentally determined so that it is sufficient to afford movement of the heads 30 on each of the fasteners portions 12 and 14 past each other with the bonding layers 22 of the fastener portions 12 and 14 maintained generally parallel to each other and with the rows of U-shaped monofilaments 24 in any relative angular orientation. This spacing, however, is generally no greater than that required for such engagement so as to provide the maximum disengagement force for the heads 30 on the fastener portions 12 and 14.

To use the strip material 10 as a fastener between two objects 16 and 18, a workman first cuts off two lengths of fastener portions 12 and 14 from the strip material 10 which fastener portions 12 and 16 are of generally equal length. He then peels away the protective liner 35 over the layer of adhesive 20 on each fastener portion 12 and 14, and presses the layers of adhesive 34 on the fastener portions 12 and 14 into engagement with the surfaces of the objects 16 and 18. As this is done the soft tacky adhesive in the layers 20 wets flows onto and adheres to the surfaces of the objects 16 or 18, and the flexible nature of the foam layer conforms to the surface of the objects 16 or 18 to facilitate such adhesion even if the surfaces of the objects 16 and 18 are somewhat rough. The heads 30 of the two fastener portions 12 and 14 can then be pressed into engagement with each other. During such engagement the cam surfaces 38 of the opposing heads 30 on the fastener portions 12 and 14 will engage, causing the stem portion 26 to deflect so that the heads 30 can seek openings between the opposing heads 30. Such stem portion 26 deflection is facilitated by localized bending of the bonding layer 22 allowed by the flexible layer of foam 32 supporting it, which bending of the bonding layer 22 will provide a better orientation of the stem portions 26 for movement of the heads 30 past each other and even some sequential movement of the heads 30 past each other via movement of some heads 30 and their supporting stem portions 26 toward the object 16 or 18 on which they are supported by compression of the layer of foam 32 until movement of other heads 30 on the fastener portions 12 and 14 past each other provides sufficient clearance for those displaced heads 30 to also pass.

Subsequently, in response to a force tending to separate the fastener portions 12 and 14, the flexible layer of foam 32 will allow the bonding layer 22 to flex and compensate for small differences in length between the stem portions 26 so that the latching surfaces 40 of most of the heads 30 are simultaneously engaged to maximize the holding force for the fastener.

We claim:

1. In a strip material which may be severed into at least two lengths to form portions of a fastener, said strip material comprising a flexible nonoriented polymeric bonding layer having an exposed major surface; a multiplicity of flexible, resilient, generally U-shaped monofilaments of longitudinally oriented polymeric material, each including a central bight portion embedded in the bonding layers and two stem portions extending from the opposite ends of said bight portion and projecting generally normal to said exposed major surface of the surface bonding layer; and enlarged generally circular heads at the ends of said stem portions opposite said bight portion, each of the heads having a semispherical cam surface opposite its supporting stem portion adapted for engagement with the cam surfaces of heads along a different portion of the strip material to produce deflection of the stem portions and movement of the heads on the stem portion past each other, and having a latching surface opposite said cam surface which latching surface is generally planar, extends at generally a right angle radially from its supporting stem portion, and is adapted to engage a similar latching surface on another head; the bight portions of said U-shaped monofilaments being disposed to afford movement of the heads along different portions of the strip material past and into releasable engagement with each other; the improvement wherein said strip material further includes a layer less than about 0.16 centimeter thick of low density closed cell polymeric foam having a density of less than about 0.32 grams per cubic centimeter on the side of said flexible bonding layer opposite said projecting stem portions, and a layer of soft tacky pressure sensitive adhesive on the side of said layer of foam opposite said bonding layer.

2. An elongate strip material according to claim 1 wherein said layer of foam has a density in the range of about 0.06 to 0.16 grams per cubic centimeter and a thickness of about 0.08 centimeter.

3. An elongate strip material according to claim 1 wherein said layer of soft tacky adhesive is a modified block copolymer adhesive of the S-B-S type.

4. An elongate strip material according to claim 1 wherein said layer of foam is of polyethylene and has a density of about 0.10 grams per cubic centimeter.

5. An elongate strip material according to claim 1 wherein said layer of adhesive when peeled from a polished surface on a stainless steel plate at a 90 degree removal angle and at a removal rate of 30.5 centimeters per minute has a minimum adhesion between the adhesive and the plate of about 1.43 kilograms per centimeter of adhesive width at the peel line.

6. In a strip material which may be severed into lengths to form portions of fasteners, said strip material comprising a flexible nonoriented polymeric bonding layer having an exposed major surface; a multiplicity of flexible, resilient, generally U-shaped monofilaments of longitudinally oriented polymeric material, each including a central bight portion embedded in the bonding layers and two stem portions extending from the opposite ends of said bight portion and projecting generally normal to said exposed major surface of the surface bonding layer; and enlarged generally circular heads at the ends of said stem portions opposite said bight portion, each of the heads having a semispherical cam surface opposite its supporting stem portion and having a latching surface opposite said cam surface which latching surface is generally planar, extends at generally a right angle radially from its supporting stem portion; the improvement wherein said strip material further includes a layer less than about 0.16 centimeter thick of low density closed cell polymeric foam having a density of less than about 0.32 grams per cubic centimeter on the side of said flexible bonding layer opposite said projecting stem portions, and a layer of soft tacky pressure sensitive adhesive on the side of said layer of foam opposite said bonding layer.

7. An elongate strip material according to claim 6 wherein said layer of foam has a density in the range of about 0.06 to 0.16 grams per cubic centimeter and a thickness of about 0.08 centmeter.

8. An elongate strip material according to claim 6 wherein said layer of soft tacky ashesive is a modified block copolymer adhesive of the S-B-S type.

9. An elongate strip material according to claim 6 wherein said layer of foam is of polyethylene and has a density of about 0.10 grams per cubic centimeter.

10. An elongate strip material according to claim 6 wherein said layer of adhesive when peeled from a polished surface on a stainless steel plate at a 90 degree removal angle and at a removal rate of 30.5 centimeters per minute has a minimum adhesion between the adhesive and the plate of about 1.43 kilograms per centimeter of adhesive width at the peel line.

* * * * *